United States Patent
Oh et al.

(10) Patent No.: US 6,953,631 B2
(45) Date of Patent: Oct. 11, 2005

(54) METHOD AND APPARATUS FOR OPERATING POLYMER ELECTROLYTE MEMBRANE FUEL CELL BELOW THE FREEZING POINT OF WATER

(75) Inventors: In Hwan Oh, Seoul (KR); Jae Jun Ko, Kyungki-Do (KR); Heung Yong Ha, Seoul (KR); Seong-Ahn Hong, Seoul (KR); Tae Won Lim, Seoul (KR); Ki Chun Lee, Kyungki-Do (KR); Soo Whan Kim, Kyungki-Do (KR); Jong Hyun Lee, Kyungki-Do (KR)

(73) Assignees: Hyundai Motor Company, Seoul (KR); Korea Institute of Science and Technology, Seoul (KR)

( * ) Notice: Subject to any disclaimer, the term of this patent is extended or adjusted under 35 U.S.C. 154(b) by 321 days.

(21) Appl. No.: 10/313,742

(22) Filed: Dec. 6, 2002

(65) Prior Publication Data

US 2003/0108781 A1 Jun. 12, 2003

(30) Foreign Application Priority Data

Dec. 8, 2001 (KR) .................................. 10-2001-0077626

(51) Int. Cl.⁷ ............................. H01M 8/04; H01M 8/10
(52) U.S. Cl. ............................... 429/13; 429/34; 429/26
(58) Field of Search ................................ 429/13, 34, 26

(56) References Cited

U.S. PATENT DOCUMENTS

| | | | | |
|---|---|---|---|---|
| 5,798,186 A | * | 8/1998 | Fletcher et al. | 429/13 |
| 6,068,941 A | * | 5/2000 | Fuller et al. | 429/13 |
| 6,103,410 A | * | 8/2000 | Fuller et al. | 429/13 |
| 6,479,177 B1 | * | 11/2002 | Roberts et al. | 429/13 |
| 2002/0119357 A1 | * | 8/2002 | Baldauf et al. | 429/30 |

* cited by examiner

Primary Examiner—John S. Maples
(74) Attorney, Agent, or Firm—Morgan Lewis & Bockius LLP

(57) ABSTRACT

A method for operating a polymer electrolyte membrane fuel cell at temperatures below the freezing point of water and an apparatus thereof are provided to prevent damage and performance degradation of the membrane-electrode assemblies. Non-humidified gas flows for several seconds before temperature of the polymer electrolyte membrane fuel cell falls below the freezing temperature of water when operation of the polymer electrolyte membrane fuel cell stops. Simultaneously, anode of the polymer electrolyte membrane fuel cell is filled with a solution having a low freezing point to prevent the temperature of a polymer electrolyte membrane fuel cell falling below the freezing point of water due to the lower ambient temperature in the winter. When the polymer electrolyte membrane fuel cell is restarted, the cell performance is not degraded reflecting that the present invention stably preserves the fuel cell.

15 Claims, 4 Drawing Sheets

METHOD AND APPARATUS FOR OPERATING POLYMER ELECTROLYTE MEMBRANE FUEL CELL BELOW THE FREEZING POINT OF WATER

FIELD OF THE INVENTION

The present invention relates to a method for modifying and operating a polymer electrolyte membrane fuel cell below the freezing point of water and an apparatus therefore. More particularly, the present invention relates to apparatus attached to a fuel cell to allow protectant fluids having a low freezing point, such as methanol, to be introduced to the fuel cell to protect against damage caused by freezing water, and also to a method for starting, operating, and stopping a so-equipped polymer electrolyte membrane fuel cell at a temperature below the freezing point of water to prevent damage of the fuel cell caused by the freezing of water in the fuel cell and to maintain fuel cell performance over repeated start-ups and shut-downs of the re-operating fuel cell.

BACKGROUND OF THE INVENTION

Generally, a fuel cell is an energy conversion device which converts chemical energy into electric energy by the electrochemical reactions between a hydrogen-containing compound, for example hydrogen gas, is a fuel and oxygen or air which is an oxidizing agent. The reaction typically takes place across a membrane. The polymer electrolyte membrane fuel cell membrane advantageously comprises a polymer as an electrolyte. A typical polymer electrolyte fuel cell is constructed by assembling a membrane-electrode assembly, gaskets, and separators.

A configuration of a conventional polymer electrolyte membrane fuel cell is as follows. Anode and cathode are placed on either side of a hydrogen ion-conductive polymer membrane. That is, the membrane typically has a first and second sides, and includes electrodes, typically an anode and cathode, one on each side thereof. The electrode for the polymer electrolyte membrane fuel cell may include, for example, carbon supported platinum or platinum-ruthenium powder for the anode and carbon supported platinum powder for the cathode.

Generally the anode and the cathode are manufactured independently by spraying catalyst ink prepared by mixing Pt or Pt/Ru catalyst powders and a polymer electrolyte ionomer on hydrated carbon papers. The electrodes for a polymer electrolyte membrane fuel cell can be manufactured by thinly coating a porous and water proof carbon paper or film with a catalyst-containing ink which is a mixture of the catalyst powder and advantageously a polymer electrolyte solution, that is, an ionomer such as Nafion solution. Typically, a spray coating, a filtration, or a screen printing method is used for coating the carbon paper with the catalyst ink.

Then, a membrane-electrode assembly may be manufactured by putting an electrolyte membrane between the anode and the cathode manufactured in this way, and hot-pressing them at a temperature above the glass transition temperature of the electrolyte while applying a predetermined pressure. The membrane-electrode assembly is a configurational element of the fuel cell which may optionally include one or more additional layers therein.

To construct a single cell, gaskets are used to achieve air tightness between the membrane-electrode assembly and separators. Operation of the fuel cell at normal, i.e., non-freezing, temperature is started by supplying hydrogen and air passing through a humidifying device to the unit cell. The supplied hydrogen and air generate electric current and water by the electrochemical reactions. The reaction formulae at the anode and cathode of the polymer electrolyte membrane fuel cell are as follows.

Anode reaction: $H_2 \rightarrow 2H^+ + 2e$

Cathode reaction: $1/2 O_2 + 2H^+ \rightarrow H_2O$

FIG. 1 is a schematic diagram of a unit cell. During normal operation the water, supplied through the humidified gas and/or generated by the electrochemical reaction, exist in various parts of the unit cell, including the cathode gas flow channel 2, the cathode catalytic layer 5, the polymer electrolyte 6, the anode catalytic layer 7, and the anode gas flow channel 10. Reference numeral 1 and 9 notes a first separator and second separator. Reference numeral 3 notes gaskets. Reference numeral 4 is a cathode carbon paper. Reference numeral 8 represents an anode carbon paper.

When operation of an operating polymer electrolyte membrane fuel cell is stopped and the external temperature of the polymer electrolyte membrane fuel cell is below the freezing point of water in the winter, the water contained in the gas can condense, and the liquid water, i.e., that water supplied by the humidified gas and that water generated by the electrochemical reaction, can freeze.

In such a unit cell the freezing of liquid water causes membrane-electrode assembly (5, 6, and 7) to be damaged due to a volume expansion of the water, and as a result performance of the fuel cell is degraded.

To address the problem, U.S. Pat. No. 5,798,186, the contents of which is incorporated herein by reference, describes a method for removing water in the passages and the membrane-electrode assembly by flowing inert non-humidified gas for a long time. However, this conventional method has a disadvantage in that it needs to flow much inert non-humidified gas for a long time in order to sufficiently remove the internal condensed water.

SUMMARY OF THE INVENTION

The present invention provides a method of operation, including start-up and shut-down operations, for a polymer electrolyte membrane fuel cell operating at a temperature below the freezing point of water. The invention also provides an apparatus capable of being used in the operation, including start-up and shut-down operations, for a polymer electrolyte membrane fuel cell operating at a temperature below the freezing point, which in a preferred embodiment of the method is used to prevent damages of passages and performance decreases of the membrane-electrode assembly or assemblies. Use of the invention eliminates the disadvantage of the prior art method wherein much inert non-humidified gas needs to flow for a long time in order to sufficiently remove the internal water. The apparatus includes means to place a protectant fluid in the fuel cell, wherein the protectant fluid removes water or changes the composition of the water such that the freezing point is below the temperatures under which the fuel cell is expected to be exposed. In one embodiment the apparatus protects against water-freezing damage by filling the inside of the fuel cell with a solution having a low freezing point, that is, a freezing point below the freezing point of water, without damaging the membrane-electrode assembly or assemblies so that the water remaining for example at a passage of a dividing plate and the membrane-electrode assembly or assemblies is not frozen.

In one embodiment the method of operating includes a method of shutting down an operating fuel cell when the temperature is at or below the freezing temperature of water. Of course, this method of shutting down a fuel cell is advantageously followed even if the temperature at the time of shut-down is above the freezing point of water, but the shut-down fuel cell will experience temperatures at or below the freezing point of water before the fuel cell is again brought into operation. The shut-down method comprises the following steps:

operating the polymer electrolyte membrane fuel cell until an operator decides to shut down the fuel cell; and after the operator decides to shut down the fuel cell:

flowing a non-humidified gas for example through one or more of the gas inlet lines, for several seconds before the temperature of the polymer electrolyte membrane fuel cell falls below the freezing point of water;

stopping the operation of the polymer electrolyte membrane fuel cell; and filling at least the anode with a protectant solution having a low freezing point.

As used herein, the terms "in fluid connection with" and "fluidly connect" mean that there is a flow channel which may or may not include valves, but through which fluid can be transferred from one vessel to another vessel. A fuel cell apparatus including means for filling the filling at least the anode with a protectant solution having a low freezing point comprises:

a first and second inlet for gases, typically a gas comprising hydrogen, for example hydrogen gas, and a gas comprising oxygen, typically oxygen gas, oxygen-enriched air, and/or air, respectively;

anode and cathode humidifiers, for supplying water to hydrogen and oxygen gas, respectively, fluidly connecting the first and second inlet for gases to respective sides of a unit cell;

the unit cell, advantageously installed in a cryostat;

a bypass line branching from cross valves for selectively flowing non-humidified gas, i.e., gas from the inlet that has not passed through the humidifiers, into the unit cell;

a solution filling tub fluidly connected to a pump branching by a line from a cross valve side, the line being extended, and in fluid communication with, the anode humidifier side. The solution filling tub and the pump are fluidly connected to each other and to the anode humidifier side. Discharge lines fluidly connect the solution filling tub and the pump connected to the unit cell side through a cross valve, and the solution filling tub and the pump are operable for supplying a protectant solution having a low freezing point to the unit cell side; and a controller for controlling the cross valves and pump in order to flow non-humidified gas or to supply the solution having a low freezing point to the fuel cell accordingly as temperature of the fuel cell goes below or above the freezing point of water, or as independently selected by the operator, or both.

Another embodiment of the invention is a method for operating a polymer electrolyte membrane fuel cell at temperatures below the freezing point of water comprising the steps of: operating the polymer electrolyte membrane fuel cell, said fuel cell comprising an anode; and stopping operation of the fuel cell, flowing non-humidified gas for several seconds before temperature of the polymer electrolyte membrane fuel cell falls below the freezing temperature of water, and simultaneously filling the anode of the polymer electrolyte membrane fuel cell with a solution having a low freezing point. This method, in order to restart operation when the external temperature of the polymer electrolyte membrane fuel cell is below the freezing point of water, may further include: operating the polymer electrolyte membrane fuel cell with non-humidified gas flowing into the cell, and then, operating the polymer electrolyte membrane fuel cell with flowing humidified gases normally after the external temperature rises above the freezing point of water. The said solution advantageously has a low freezing point and comprises methanol, ethylene glycol, ethanol, butanol, or mixture thereof, wherein if methanol than the methanol is adjusted to have a concentration of from 3M to 7M.

Another embodiment of the invention is a polymer electrolyte membrane fuel cell apparatus adapted for operating at a temperature below the freezing point of water, the apparatus comprising: anode and cathode humidifiers for humidifying hydrogen gas and oxygen gas, respectively; a unit cell installed in a cryostat; a bypass line branched by cross valves for selectively flowing non-humidified gas into the unit cell without passing through the anode and cathode humidifiers; a solution filling tub and a pump branched by a line from a cross valve side, the line being extended from the anode humidifier, the solution filling tub and the pump being connected to each other, discharge lines of the solution filling tub and the pump being connected to the unit cell through a cross valve, and the solution filling tub and the pump adapted to supply a solution having a low freezing point to the unit cell; and a controller for controlling the cross valves and pump in order to flow a non-humidified gas, or to supply the solution having a low freezing point accordingly, or both, as the temperature of the fuel cell is below or above the freezing point of water.

Another embodiment of this invention is a method of operating a polymer electrolyte membrane fuel cell comprising the steps of: operating the polymer electrolyte membrane fuel cell by supplying humidified hydrogen-containing fuel gas and oxygen-containing gas to the fuel cell, said fuel cell comprising an anode and a cathode; and stopping operation of the fuel cell, wherein stopping the operation of the fuel cell includes the steps of:

flowing non-humidified gas for at least a time sufficient to substantially remove the humidified gas from the fuel cell; and adding an amount of a protectant fluid to at least the anode of the polymer electrolyte membrane fuel cell, wherein the protectant fluid comprises a polar organic solvent that has a freezing point below zero degrees centigrade, and the amount of the protectant fluid is sufficient to prevent water in the fuel cell from damaging the fuel cell by freezing. The protectant fluid in one embodiment comprises an alcohol, a polyol, or mixture thereof. The amount of protectant fluid in one embodiment is sufficient to substantially fill the anode of the polymer electrolyte membrane fuel cell. In one embodiment the non-humidified gas comprises nitrogen. In one embodiment the protectant fluid comprises methanol. In another embodiment the protectant fluid comprises glycol, an alkene-substituted glycol, or mixtures thereof. In one embodiment the method further comprises starting the operation of the polymer electrolyte membrane fuel cell, wherein starting the operation comprises:

providing a non-operating polymer electrolyte membrane fuel cell;

optionally removing protectant fluid from the anode;

flowing non-humidified hydrogen-containing fuel gas and oxygen-containing gas to the polymer electrolyte membrane fuel cell;

heating the polymer electrolyte membrane fuel cell to a temperature above about zero degrees Centigrade; and imposing a load on the fuel cell by completing an electrical circuit between the cathode and the anode, thereby starting operation and having an operating polymer electrolyte membrane fuel cell. The non-humidified hydrogen-containing fuel gas and oxygen-containing gas flowing to the polymer electrolyte membrane fuel cell is advantageously replaced by humidified hydrogen-containing fuel gas and oxygen-containing gas after the polymer electrolyte membrane fuel cell reaches a temperature above about zero degrees Centigrade. In one embodiment, the temperature of the non-operating polymer electrolyte membrane fuel cell prior to starting is below zero degrees Centigrade. The anode portion of the non-operating polymer electrolyte membrane fuel cell prior to starting may contain a protectant fluid.

In yet another embodiment, the invention includes a polymer electrolyte membrane fuel cell apparatus comprising:

first and second feed lines adapted to provide hydrogen-containing fuel gas and oxygen-containing gas, respectively;

anode and cathode humidifiers each adapted to humidify hydrogen-containing fuel gas and oxygen-containing gas, wherein the humidifiers are in flowing communication with the respective feed lines;

a polymer electrolyte membrane fuel cell comprising at least one anode and at least one cathode, wherein the at least one anode and at least one cathode are in flowing communication with the respective anode and cathode humidifiers;

at least one bypass line comprising a valve and adapted to selectively flow gas from at least one feed line to at least one of the anode and cathode without humidifying the hydrogen-containing fuel gas and/or oxygen-containing gas;

a protectant fluid feed line in flowing communication with the at least one anode, wherein said protectant fluid feed line is adapted to flow protectant fluid to the at least one anode. The polymer electrolyte membrane fuel cell apparatus may further comprise means to flow the protectant fluid to the at least one anode, and means to selectively control the flow of gas through the at least one bypass line. The polymer electrolyte membrane fuel cell apparatus may include a first bypass line comprising a valve and adapted to selectively flow gas from a first feed line to the at least one anode without humidifying the hydrogen-containing fuel gas; a second bypass line comprising a valve and adapted to selectively flow gas from the second feed line to the at least one cathode without humidifying the oxygen-containing gas; and further comprising a means to selectively control the flow of gas through each bypass line. Alternatively, the polymer electrolyte membrane fuel cell apparatus may further comprise a first bypass line comprising a valve and adapted to selectively flow gas from a first feed line to the at least one anode without humidifying the hydrogen-containing fuel gas; a second bypass line comprising a valve and adapted to selectively flow gas from the second feed line to the at least one cathode without humidifying the oxygen-containing gas; a pump in flowing connection with the protectant fluid feed line and adapted to flow protectant fluid to the at least one anode; a heater to heat the electrolyte membrane fuel cell apparatus; and means to control the valve on each bypass line and the pump.

BRIEF DESCRIPTION OF THE DRAWINGS

The above-mentioned objects, features and advantages of the present invention will be more apparent from the following detailed description taken in conjunction with the accompanying drawings, in which.

DETAILED DESCRIPTION OF THE INVENTION

Hereinafter, the present invention will be described with reference to the accompanying drawings. In the following description of the present invention, a detailed description of the known functions and configurations of various items may be omitted when they are known to one of ordinary skill in the art.

Figure 1:
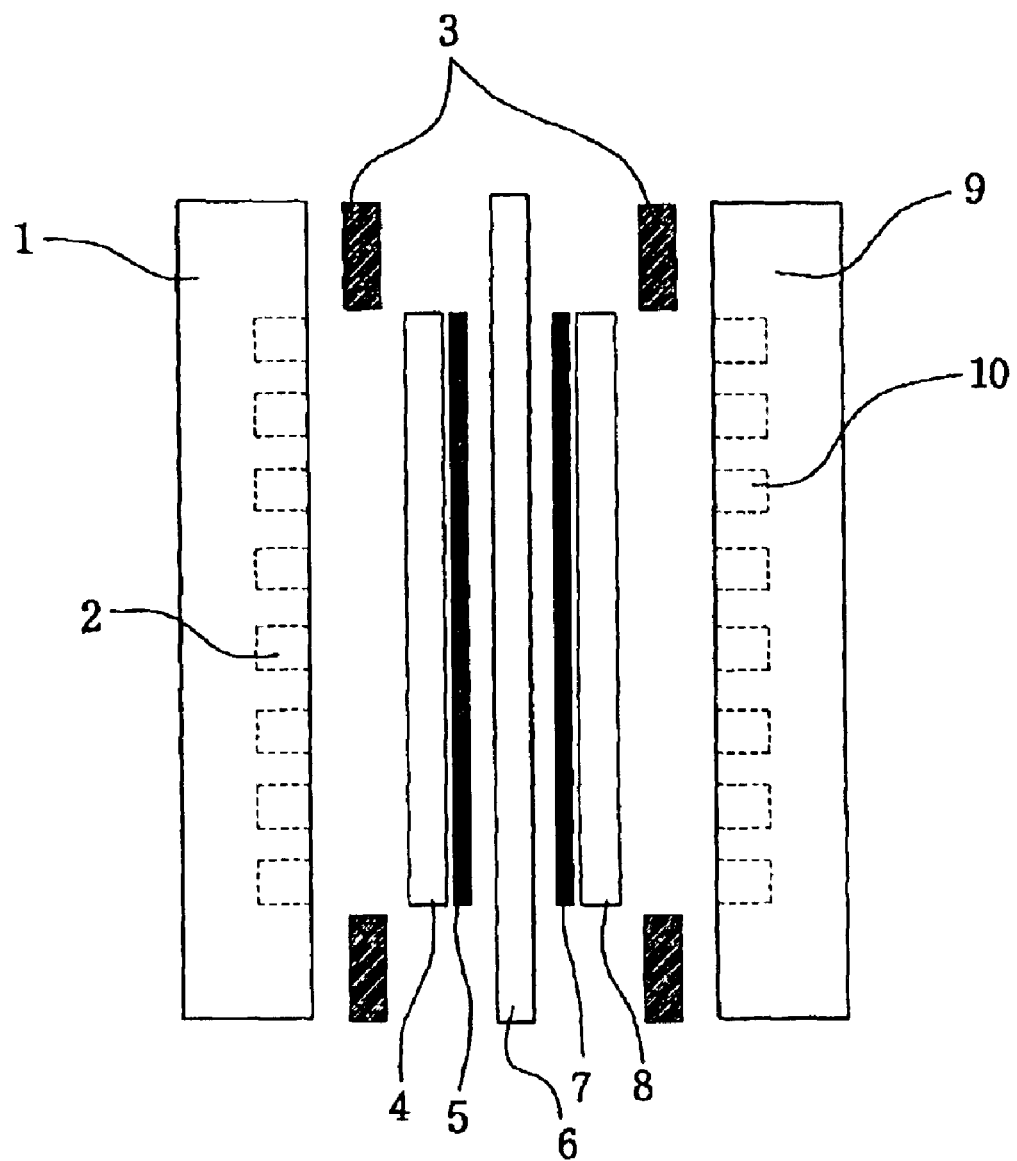
FIG. 1 is a schematic diagram of a unit cell.
Figure 2:
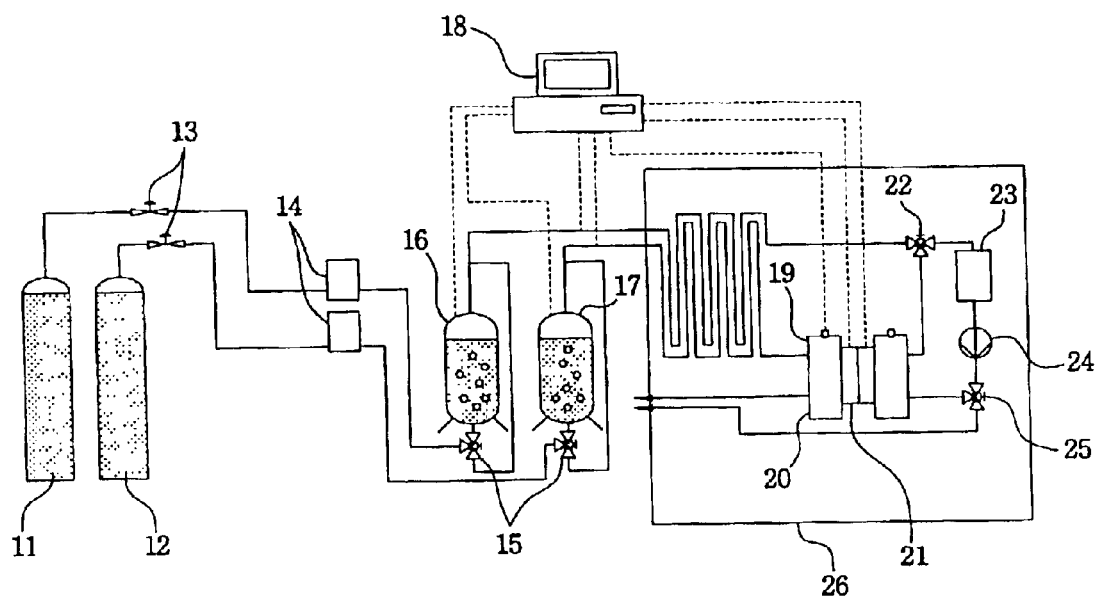
FIG. 2 is a schematic configuration of an apparatus for operating a polymer electrolyte membrane fuel cell at temperatures below the freezing point of water according to the present invention.

FIG. 2 schematically shows a configuration of an apparatus for operating a polymer electrolyte membrane fuel cell below the freezing point of water according to the present invention.

The apparatus includes gas inlet lines represented by tanks 11 and 12, anode and cathode humidifiers 16 and 17, an unit cell 20, at least one bypass line, a solution filling tub 23, a pump 24, and a controller 18.

The anode humidifier 16 humidifies hydrogen gas from source 11. The cathode humidifier 17 humidifies oxygen gas from source 12. Of course, if the gas at the inlet is already humidified, or if the fuel does not require humidified gas, the humidifiers can be omitted. In a preferred embodiment, the inlet gases are substantially dry, so that condensation of water in the inlet lines does not occur. The unit cell 20 is advantageously installed in a cryostat 26. As used herein, a cryostat is an enclosure within which the temperature can be monitored and optionally controlled. The bypass line(s) is/are branched by cross valve(s) 15. The bypass line selectively flows non-humidified gas into the unit cell 20 without passing through the anode and cathode humidifiers 16 and 17. In some embodiments, the bypass valve can meter, that is, proportionately split, the amount of gas simultaneously passing through the humidifier and the bypass line.

Advantageously, the solution filling tub 23 and pump 24 are located within the cryostat 26. The solution filling tub 23 and pump 24 are branched by a line from a cross valve 16 side. The line is extended from the anode humidifier 16 side. The solution filling tub 23 and the pump 24 are fluidly connected to each other. Discharge lines of the solution filling tub 23 and the pump 24 are connected to the unit cell 20 side through a cross valve 25. The solution filling tub 23 and the pump 24 supply a protectant solution having a low freezing point to the unit cell 20.

The controller 18 controls the cross valves 15, 22, and 25 and the pump 24 in order to flow non-humidified gas and/or to supply the solution having a low freezing point accordingly as a temperature of the fuel cell is below or above the freezing point of water.

Reference numeral 13 notes a two-way valve. Reference numeral 14 notes a flow control device. Reference numeral 18 represents a controller. Reference numeral 19 represents a heating bar. Reference numeral 21 represents an electrolyte membrane assembly.

A method for operating a polymer electrolyte membrane fuel cell at temperatures below the freezing point of water according to the present invention will be described.

When operation of a polymer electrolyte membrane fuel cell is stopped or is to be stopped, and the ambient conditions are such that the cell may be exposed to freezing temperatures, cross valves 15 installed at humidifiers 16 and 17 adjust before the temperature of the polymer electrolyte membrane fuel cell falls below the freezing point of water to increase the amount of dry, that is, non-humidified, gas that flows to the fuel cell. In one advantageous embodiment, the flow through one or both of the humidifiers is completely terminated. The amount of non-humidified gas flowed, in one embodiment, is an amount at least sufficient to substantially remove the humidified gas from the fuel cell. By substantially remove, plug flow can be assumed, so that the amount of non-humidified gas is at least about equal to the volume of the flow lines and vessels including the fuel cell itself through which the gas must pass.

Non-humidified gas flows through the bypass line by adjusting the cross valves 15 for several seconds. Advantageously, the amount of non-humidified gas flow is sufficient to substantially displace the humidified gas from the flow lines, and in some embodiments also from the fuel cell. In some embodiments, the non-humidified gas can be a gas other than the hydrogen-containing gas and/or the air. For example, in some embodiments much nitrogen, nitrogen-enriched air, or may be used. Cross valves 22 and 25 installed at the solution filling tub 23 are in one embodiment adjusted to prevent the non-humidified gas from entering the solution filling tub 23 side, but are also adjusted to supply a solution having a low freezing point of water to a fuel cell. In one embodiment, protectant fluid is flowed through the fuel cell and the water therein is substantially removed. In another embodiment, the water in the fuel cell is miscible with the protectant fluid, and the mixture of water and protectant fluid has a freezing point below, often well below, about zero degrees centigrade. So, freezable water contained in the fuel cell is removed and the solution is generally filled up in the solution filling tub 23.

Any solvent that is miscible with water, has a freezing point below that of water, and is compatible with the fuel cell apparatus is usable. In some embodiments, the protectant fluid may comprise non-polar organic solvents, but these would usually be admixed with polar organic solvents. The protectant solution may comprise alcohols and/or polyalcohols. The protectant solution advantageously includes methanol and/or other alcoholic solvents such as ethylene glycol, ethanol, or butanol.

In some embodiments, the protectant fluid may comprise water.

When filling the solution filling tub 23 with methanol as the solution having a low freezing point, advantageously methanol with a concentration of from 3M to 7M is used. In some embodiments the protectant fluid is substantially volatile.

In some embodiments it may be advantageous to add a predetermined amount of protectant fluid to the fuel cell, wherein the amount fills or does not fill the anode portion of the fuel cell, the flow lines, and the like, provided those portions amenable to damage by freezing water, for example the membrane-electrode assemblies, are protected and advantageously contacted by the protectant fluid.

Accordingly, when temperature of a fuel cell also falls below the freezing point of water, the internal membrane-electrode assemblies are stably protected. That is, the water is removed from the membrane-electrode assemblies, or is put into a solution wherein the solution will not freeze and damage the membrane-electrode assemblies.

In order to re-operate, that is, start, the fuel cell when the external temperature of the polymer electrolyte membrane fuel cell is below the freezing point of water, the cross valves 15 of humidifiers 16 and 17 are adjusted so that non-humidified gas flows through the bypass line. A controller 18 advantageously increases the temperature of the fuel cell, and advantageously provides a load so that an external circuit generates an electric current and an operation of the polymer electrolyte membrane fuel cell starts.

When the temperature of the polymer electrolyte membrane fuel cell rises above a predetermined temperature, which is the freezing point of water, by again adjusting the cross valves 15 of humidifiers 16 and 17, the polymer electrolyte membrane fuel cell is continuously operated while the humidifying gas flows normally.

In one embodiment the protectant fluid is withdrawn from the fuel cell prior to start of the fuel cell operation. In another embodiment the protectant fluid is withdrawn from the apparatus while the gas is flowing.

Advantageously, the protectant fluid may be cycled back to the vessel 23. Vessel 23 may have means to regenerate, for example to remove water, from the protectant fluid.

Hereinafter, in order to help understanding with respect to the present invention, exemplary embodiments will be explained.

EXAMPLE 1

At first, in order to form a catalytic layer, 20 wt % Pt/C catalyst was dispersed in isopropanol, and 5 wt % Nafion solution (Dupont Co., Ltd.) was added thereto to make a catalyst slurry.

The catalyst slurry was sprayed on a carbon paper containing 20 wt % PTFE using an air brush gun to form the catalyst layer. The catalytic layer was dried in a drying furnace at 70° C. for about one hour. Then, a Nafion solution and the isopropanol were mixed, and the mixed solution was coated on the catalytic layer to manufacture an anode and cathode. Active area of the electrodes was 25 $cm^2$ with platinum loading t of 0.4 $mg/cm^2$.

Nafion 115 (TM, Dupont Co., Ltd.) is used as an electrolyte. The manufactured anode and cathode were put at both sides of the electrolyte and hot-pressed at 140° C. under a pressure of 200 $kg/cm^2$ to manufacture the membrane-electrode assembly. The unit cell was manufactured using the prepared membrane-electrode assemblies which was then installed in the cryostat.

Hydrogen and oxygen were supplied to operate the unit cell. When the unit cell reached steady state, performance of the polymer electrolyte membrane fuel cell was measured.

After temperature of the cryostat is set to −10° C., the operation of the unit cell was stopped.

Before the temperature of the unit cell fell below the freezing point of water, the anode was filled with 5M methanol solution. After temperature of the unit cell was maintained at 10° C. for 6 hours, the controller increased the temperature of the unit cell to 80° C., and the operation of the unit cell was resumed. The performance of the polymer electrolyte membrane fuel cell was measured.

Figure 3:
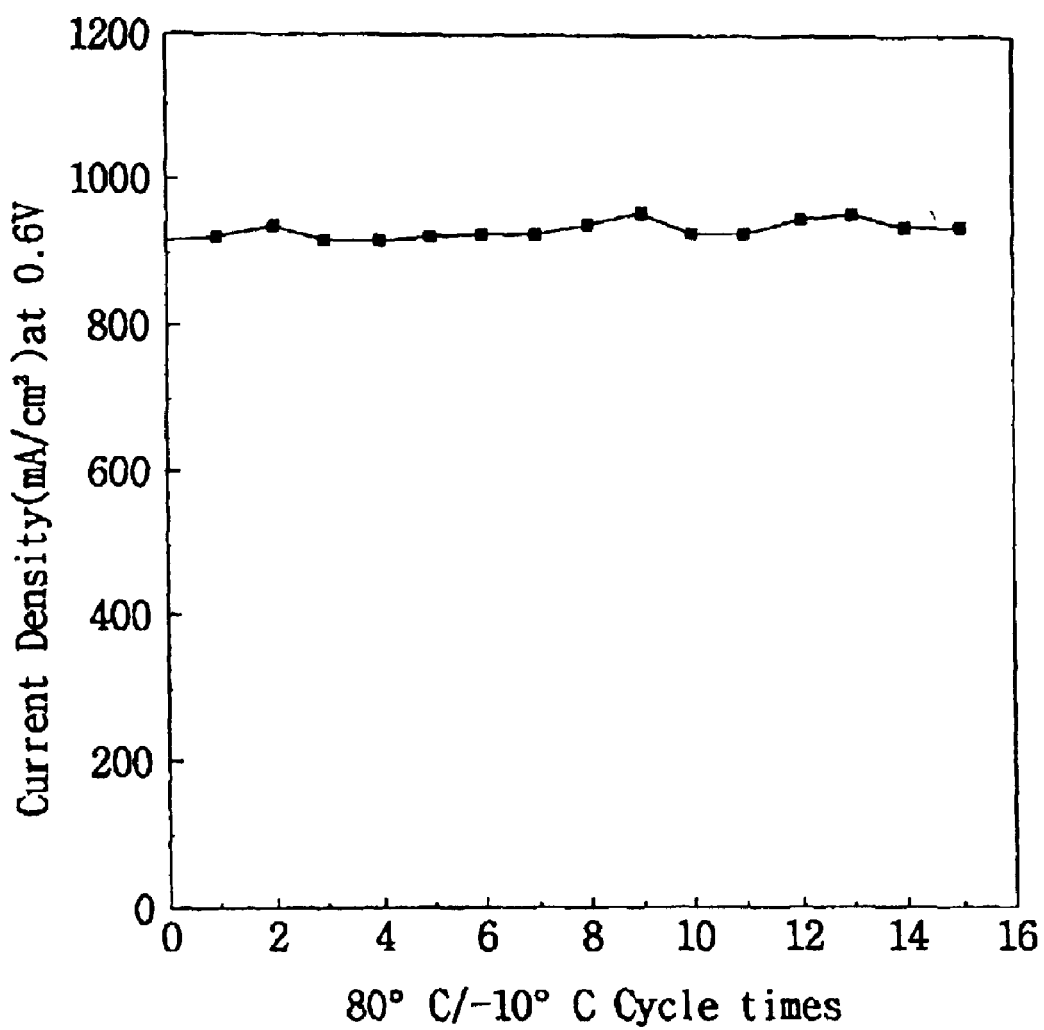
FIG. 3 shows an experimental result of the first embodiment according to the present invention.

FIG. 3 shows the change in the performance, as measured by current density, by showing current density measured at a cell voltage of 0.6 V and at a cell temperature of 80° C. during 15 repeated cycles as described above.

The polymer electrolyte membrane fuel cell exhibited a current density of 920 $mA/cm^2$ as an initial performance. Even though the cycles progress, the performance of the fuel cell remained almost constant. After 15 cycles, current density is measured to be 936 $mA/cm^2$ as the performance thereof.

EXAMPLE 2

Figure 4:
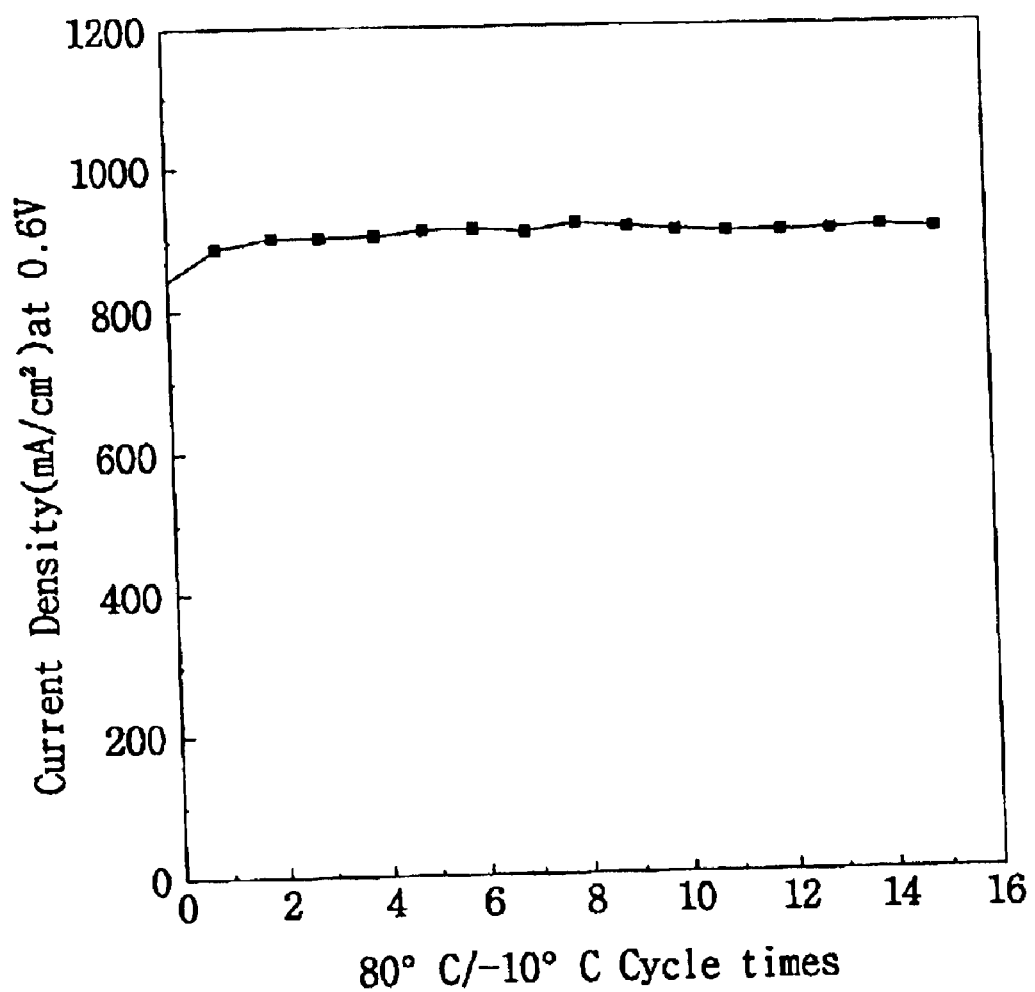
FIG. 4 exhibits an experimental result of the second embodiment according to the present invention.

Following the procedures of the above mentioned embodiment, 5M ethylene glycol was filled up in the anode as opposed to the 5M methanol. As before, for each cycle the unit cell was maintained at −10° C. for 6 hours. The controller increased the temperature of the unit cell to 80° C. and the performance of the polymer electrolyte membrane fuel cell was measured. FIG. 4 is shows the experimental result of the second embodiment according to the present invention.

The polymer electrolyte membrane fuel cell exhibited a current density of 852 mA/cm$^2$ as an initial performance. Even though the cycle progresses, the performance of the fuel cell remains almost constant After 15 cycles, current density was measured to be 912 mA/cm$^2$ as the performance.

As mentioned above, even though a polymer electrolyte membrane fuel cell is stopped and the temperature of the polymer electrolyte membrane fuel cell falls below the freezing point of water due to the lower ambient temperature in the winter, the present invention stably preserves the fuel cell. When the polymer electrolyte membrane fuel cell restarts, the cell performance is not degraded.

Also, much non-humidified gas such as nitrogen or air flows for a long time. The present invention is economical reducing the time and the amount of gas required to remove the internal water.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for operating a polymer electrolyte membrane fuel cell at temperatures below the freezing point of water comprising:

operating the polymer electrolyte membrane fuel cell, said fuel cell comprising an anode;

stopping operation of the fuel cell;

flowing non-humidified gas for several seconds before temperature of the polymer electrolyte membrane fuel cell falls below the freezing temperature of water; and simultaneously filling the anode of the polymer electrolyte membrane fuel cell with a solution having a low freezing point.

2. The method according to claim 1, wherein in order to restart operation when the external temperature of the polymer electrolyte membrane fuel cell is below the freezing point of water, the method further comprises:

operating the polymer electrolyte membrane fuel cell with non-humidified gas flowing into the cell; and then, operating the polymer electrolyte membrane fuel cell with flowing humidified gases normally after the external temperature rises above the freezing point of water.

3. The method according to claim 1, wherein said solution having a low freezing point comprises methanol, ethylene glycol, ethanol, butanol, or mixture thereof.

4. The method according to claim 2, wherein said solution having a low freezing point comprises methanol, ethylene glycol, ethanol, butanol, or mixture thereof.

5. The method according to claim 3, wherein said methanol is adjusted to have a concentration of from 3M to 7M.

6. A method for operating a polymer electrolyte membrane fuel cell, comprising:

operating the polymer electrolyte membrane fuel cell by supplying humidified hydrogen-containing fuel gas and oxygen-containing gas to the fuel cell, said fuel cell comprising an anode and a cathode; and stopping operation of the fuel cell, wherein stopping the operation of the fuel cell includes the steps of:

flowing non-humidified gas for at least a time sufficient to substantially remove the humidified gas from the fuel cell; and adding an amount of a protectant fluid to at least the anode of the polymer electrolyte membrane fuel cell, wherein the protectant fluid comprises a polar organic solvent that has a freezing point below zero degrees centigrade, and the amount of the protectant fluid is sufficient to prevent water in the fuel cell from damaging the fuel cell by freezing.

7. The method according to claim 6, wherein the protectant fluid comprises an alcohol, a polyol, or mixture thereof.

8. The method according to claim 6, wherein the amount of protectant fluid is sufficient to substantially fill the anode of the polymer electrolyte membrane fuel cell.

9. The method according to claim 6, wherein the non-humidified gas comprises nitrogen.

10. The method according to claim 6, wherein the protectant fluid comprises methanol.

11. The method according to claim 6, wherein the protectant fluid comprises glycol, an alkene-substituted glycol, or mixtures thereof.

12. The method according to claim 6, wherein the method further comprises starting the operation of the polymer electrolyte membrane fuel cell, wherein starting the operation comprises:

providing a non-operating polymer electrolyte membrane fuel cell;

optionally removing protectant fluid from the anode;

flowing non-humidified hydrogen-containing fuel gas and oxygen-containing gas to the polymer electrolyte membrane fuel cell;

heating the polymer electrolyte membrane fuel cell to a temperature above about zero degrees Centigrade; and imposing a load on the fuel cell by completing an electrical circuit between the cathode and the anode, thereby starting operation and having an operating polymer electrolyte membrane fuel cell.

13. The method according to claim 12, wherein the non-humidified hydrogen-containing fuel gas and oxygen-containing gas flowing to the polymer electrolyte membrane fuel cell is replaced humidified hydrogen-containing fuel gas and oxygen-containing gas after the polymer electrolyte membrane fuel cell reaches a temperature above about zero degrees Centigrade.

14. The method according to claim 12, wherein the temperature of the non-operating polymer electrolyte membrane fuel cell prior to starting is below zero degrees Centigrade.

15. The method according to claim 12, wherein at least the anode portion of the non-operating polymer electrolyte membrane fuel cell prior to starting contains a protectant fluid.

* * * * *